US008310326B2

(12) United States Patent
Espino

(10) Patent No.: US 8,310,326 B2
(45) Date of Patent: Nov. 13, 2012

(54) METHOD AND APPARATUS FOR ADJUSTING DISPLACEMENT CURRENT IN AN ENERGY TRANSFER ELEMENT

(75) Inventor: Marvin C. Espino, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 13/408,785

(22) Filed: Feb. 29, 2012

(65) Prior Publication Data

US 2012/0151749 A1 Jun. 21, 2012

Related U.S. Application Data

(63) Continuation of application No. 12/266,386, filed on Nov. 6, 2008, now Pat. No. 8,154,371.

(51) Int. Cl.
*H01F 27/32* (2006.01)
*H01F 38/12* (2006.01)
*H01F 27/10* (2006.01)
*H05K 7/14* (2006.01)
*H05K 9/00* (2006.01)
*G01R 19/00* (2006.01)
*G01R 31/06* (2006.01)
*G01R 27/00* (2006.01)
*G01R 27/08* (2006.01)
*G01R 31/28* (2006.01)

(52) U.S. Cl. ............... 336/84 R; 336/84 C; 336/84 M; 336/87; 361/800; 361/816; 324/76.11; 324/547; 324/600; 324/713; 29/593

(58) Field of Classification Search ............... 336/84 R, 336/84 C, 84 M, 87; 361/800, 816; 324/546, 324/547, 600, 613, 615, 713, 76.11; 174/350; 29/593

See application file for complete search history.

(56) References Cited

U.S. PATENT DOCUMENTS 4,041,364 A * 8/1977 Gauper, Jr. ............... 363/15
(Continued)

FOREIGN PATENT DOCUMENTS
WO WO 03/098788 A1 11/2003

OTHER PUBLICATIONS

Cochrane, D., "Passive Cancellation of Common-Mode Electromagnetic Interference in Switching Power Converters," Thesis submitted to the Faculty of the Virginia Polytechnic Institute and State University, Blacksburg, VA, Aug. 10, 2001, pp. i-viii, 1-96.

(Continued)

*Primary Examiner* — Mohamad Musleh
*Assistant Examiner* — Tsz Chan
(74) *Attorney, Agent, or Firm* — Blakely Sokoloff Taylor & Zafman LLP

(57) ABSTRACT

Example methods include calculating a first number of turns of a shield winding included in an energy transfer element of a power supply. A first number of turns of the shield winding is calculated for the power supply to have a low noise current in an input conductor of the power supply. The method then includes increasing the first number of turns to a second number of turns. The power supply is then operated, which generates a first voltage waveform of a voltage between the input conductor and an output conductor of the power supply. An impedance is then inserted between the shield winding and the input conductor. The noise current is reduced by adjusting a value of the impedance until a second voltage waveform of the voltage between the input conductor and the output conductor reverses polarity to be the opposite of a polarity of the first voltage waveform.

13 Claims, 4 Drawing Sheets

U.S. PATENT DOCUMENTS

| | | | |
|---|---|---|---|
| 4,507,721 | A | 3/1985 | Yamano et al. |
| 5,150,046 | A | 9/1992 | Lim |
| 5,724,236 | A | 3/1998 | Oglesbee |
| 6,549,431 | B2 | 4/2003 | Odell et al. |
| 6,850,423 | B2 | 2/2005 | Lanni |
| 6,977,803 | B2 | 12/2005 | Park |
| 6,982,621 | B2 | 1/2006 | Park |
| 6,995,990 | B2 | 2/2006 | Odell et al. |
| 7,109,836 | B2 | 9/2006 | Park |
| 7,119,647 | B2 | 10/2006 | Park |
| 7,276,999 | B2 | 10/2007 | Odell et al. |
| 2006/0028782 | A1 | 2/2006 | Polivka et al. |
| 2006/0072348 | A1 | 4/2006 | Park |
| 2006/0103366 | A1 | 5/2006 | Akselrod et al. |
| 2009/0082833 | A1 | 3/2009 | Wosmek et al. |

OTHER PUBLICATIONS

Cochrane, D. et al., "Passive Cancellation of Common-Mode Noise in Power Electronic Circuits," IEEE Transactions on Power Electronics, vol. 18, No. 3, May 2003, pp. 756-763.

Novel Techniques to Cancel Common-mode Noise Based on Noise Balance, http://www.delta.com.tw/product/cp/emi/download/Novel%20Techniques.pdf, Delta Electronics, Inc., Accessed Nov. 6, 2008, pp. 1-5.

* cited by examiner

METHOD AND APPARATUS FOR ADJUSTING DISPLACEMENT CURRENT IN AN ENERGY TRANSFER ELEMENT

REFERENCE TO PRIOR APPLICATIONS

This application is a continuation of U.S. application Ser. No. 12/266,386, filed Nov. 6, 2008, now pending. U.S. application Ser. No. 12/266,386 is hereby incorporated by reference.

TECHNICAL FIELD

This disclosure relates generally to power supplies and, in particular but not exclusively, relates to methods and apparatuses for reducing common mode noise current in switching power supplies.

BACKGROUND INFORMATION

Many electrical devices such as cell phones, personal digital assistants (PDA's), laptops, etc. need a source of dc power. Because power is generally delivered through a wall outlet as high-voltage ac power, a device, typically referred to as a power supply, is required to convert the high-voltage ac power to usable dc power for many electrical devices. Moreover, the power supply often must provide a type of electrical isolation between the source of high voltage ac power and the dc power to meet the requirements of safety agencies. The usable dc power may be provided by the power supply directly to the device or it may be used to charge a rechargeable battery that, in turn, provides energy to the device, but which requires charging once stored energy is drained. In operation, a power supply may use a controller to regulate output power delivered to an electrical device that may be generally referred to as a load. The controller regulates the transfer of energy to the load. In one instance a controller may control a power switch to turn on and off in response to feedback information from a sensor to transfer energy pulses to the output from the high-voltage ac power source.

Every conductor in a power supply is electrically coupled to the space external to the power supply through an electric field. There is a difference in voltage between any two points in an electric field. Therefore, there is a voltage between every conductor in the power supply and an arbitrary reference location outside the power supply that is often referred to as earth ground, sometimes referred to simply as earth, or as ground. The voltage between a conductor and earth may be positive, negative, or zero.

The coupling of the electric field and the associated voltage is typically represented as stray capacitance in an electric circuit. When the voltage between a conductor and earth changes value, it creates a displacement current in the stray capacitance that couples the conductor to earth. A large rate of change in the voltage can produce a substantial displacement current. The current is referred to as displacement current to distinguish it from conduction current. A displacement current is a changing electric field in space that is equivalent to a movement of electric charge in a conductor. Current that is a movement of charge in a conductor is referred to as conduction current.

A dc current has a constant value with respect to time. In contrast, an ac current is a value that varies with time. A current in general can be the sum of a dc current and an ac current. Conduction current can be the sum of a dc current an ac current. However, a displacement current is only an ac current because an ac current is equivalent to a changing electric field.

Electric current flows in a closed path. In other words, for every current leaving a location there must be a current of the same magnitude returning to the same location. The rule of the closed path holds for both displacement current and for conduction current. The closed path of a current can include both displacement current and conduction current.

A power supply typically must limit noise current in its input conductors to meet the limits specified by regulatory agencies. Current that has the same magnitude and direction (toward the power supply or away from the power supply) in two or more conductors at the same time is called common mode current. Current that has the same magnitude but opposite directions in two conductors is called differential current.

The common mode current in the input conductors is generally a noise current that does not contribute to the power received by the power supply, whereas the differential current provided by the input voltage source delivers the power received by the power supply. Common mode current originates chiefly from the fast switching of high voltage in the power supply. The displacement current that is created by the changing voltage returns to its place of origin on a path that includes the input conductors of the power supply, and therefore contributes to the noise current that is limited by regulatory agencies.

One way to reduce the common mode current is to place inductive components in the input conductors. These components are sometimes referred to as common mode inductors or as common mode chokes. A common mode inductor has two or more windings on a common magnetic core where the windings are configured to oppose common mode noise currents that would flow in the same direction in the input conductors while offering negligible opposition to differential currents that provide power to the power supply. A preferred alternative to the use of common mode inductors in the input conductors is to add special windings to an energy transfer element that is already in the power supply for power conversion purposes.

The energy transfer element in the power supply, sometimes called a transformer, is an inductive component with multiple windings on a magnetic core. During operation the transformer allows the transfer of energy between an input side (referred to as a primary side) of the power supply and an output side (referred to as the secondary side) of the power supply. The transformer also provides galvanic isolation between the input and an output of the power supply. Galvanic isolation is a property that prevents dc current from flowing between an input conductor and an output conductor. A winding necessary for power conversion is a power winding. "Special windings" are additional windings that do not take part in the power conversion function. A winding that may provide both shielding functions and power conversion functions, such as for example a bias winding that provides a bias voltage to operate a component of a control circuit, is considered a power winding, not a special winding.

The special windings are often referred to as balance windings and cancellation windings. They are sometimes included in the general category of shield windings that distinguish them from the power conversion windings that are required for the power supply to operate. The purpose of the special windings is to restrict the displacement current to a path that does not include the input conductors of the power supply. It is preferred that displacement current remains within the energy transfer element, and that the equivalent conduction current does not go very far beyond the terminals of the energy transfer element. The special windings accomplish their purpose by introducing electric fields at the proper place and in the proper strength to steer the displacement current to take a desired path.

Well-known methods have been developed to design and to construct energy transfer elements that contain shield windings for the purpose of reducing common mode current in power supplies. These methods encounter difficulties when a winding of the energy transfer element has a small number of turns. The conventional methods are most effective when the shield windings have an integral number of turns that is close to the number of turns of the power conversion windings.

In applications to power supplies where the ratio of input voltage to output voltage is very large or very small, a power winding can have as few as one or two turns. In such situations, it may be impossible to give a conventional shield winding the number of turns necessary to achieve the desired reduction in displacement current. If the shield winding produces an electric field that is too small, the winding will not be very effective. If the shield winding produces an electric field that is too large, the winding can cause the common mode current to increase instead of decrease.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Examples of a Method and Apparatus for Adjusting Displacement Current in an Energy Transfer Element are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

Figure 1:
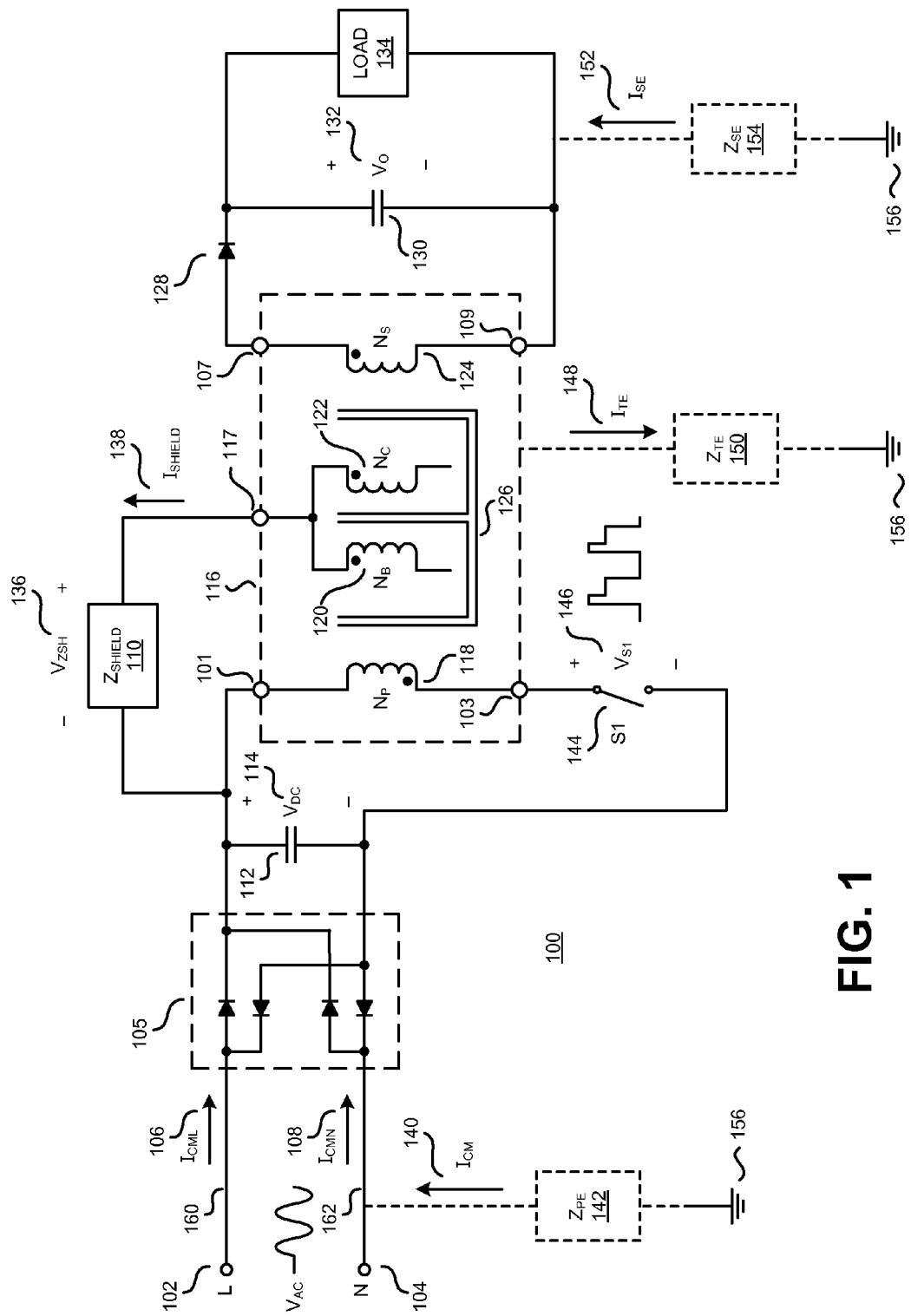
FIG. 1 is a schematic diagram illustrating an example ac-to-dc power supply in accordance with the teachings of the present invention.

The example schematic diagram 100 in FIG. 1 shows elements, voltages, and currents of a power supply 100, in accordance with the teachings of the present invention. General stray impedances $Z_{PE}$ 142, $Z_{TE}$ 150, and $Z_{SE}$ 154 represent the coupling between various parts of power supply 100 and earth reference 156. Stray impedances $Z_{PE}$ 142, $Z_{TE}$ 150, and $Z_{SE}$ 154 are typically dominated by capacitance, but they may contain inductive and resistive elements as well. The currents shown in FIG. 1 (e.g., 106 and 108) are noise currents. FIG. 1 does not show currents that contribute to the power received and delivered by power supply 100.

As shown in the example of FIG. 1, an ac input voltage $V_{AC}$ is applied at an input of power supply 100 between a line terminal 102 and a neutral terminal 104. A full wave bridge rectifier 105 receives the ac input voltage $V_{AC}$ to produce a dc input voltage $V_{DC}$ 114 on dc input capacitor 112. In one example, the conductors of the dc input capacitor 112 are considered input conductors of power supply 100. The dc input voltage $V_{DC}$ 114 is coupled to a power winding (i.e., primary winding 118 of energy transfer element 116) and to a switch S1 144. In one example, switch S1 144 opens and closes under the control of a controller circuit. The controller circuit is not shown to avoid obscuring the features of the invention.

Energy transfer element 116 has internal terminations that terminate windings internal to the energy transfer element, and it has external terminations that terminate windings external to the energy transfer element. Internal terminals do not carry conduction current to or from circuits external to the energy transfer element. Internal terminations need not be accessible outside the energy transfer element. External terminations are accessible outside the energy transfer element. External terminations carry conduction current to or from circuits external to the energy transfer element. In one example an external termination may be an external pin, post, or pad of a transformer that carries conduction current to or from a circuit external to the transformer. In one example, an internal terminal may be mechanically coupled to an external pin, post, or pad of a transformer that does not carry conduction current to or from a circuit external to the transformer. It is sometimes convenient in the manufacture of a transformer to use an external pin, post, or pad of a transformer to fasten one end of a winding that will carry no conduction current. Such terminations are internal terminations in this disclosure. FIG. 1 shows that winding 118 has two external terminations (i.e., terminal 101 and terminal 103), winding 120 has one internal termination and one external termination 117, winding 122 has one internal termination and one external termination 117, and winding 124 has two external terminations (i.e., terminal 107 and terminal 109).

Secondary winding 124 of energy transfer element 116 is coupled to a rectifier 128 to produce an output voltage $V_O$ 132 on an output capacitor 130 for use by a load 134. Energy transfer element 116 includes a core 126 of a material that has high magnetic permeability. In one example, the material of the core 126 is ferrite. In addition to the primary winding 118 that has $N_P$ turns and the secondary winding 124 that has $N_S$ turns, energy transfer element 116 includes a balance winding 120 that has $N_B$ turns and a cancellation winding 122 that has $N_C$ turns. The terms "balance" and "cancellation" further describe the actions of the shield windings (i.e., balance winding 120 and cancellation winding 122) relative to the electric fields within the energy transfer element 116 and are used in this disclosure to acknowledge the presence of different types of shield windings.

In the illustrated example of FIG. 1, one end of the balance winding 120 and one end of the cancellation winding 122 are coupled at an external terminal (e.g., external termination 117). External termination 117 is coupled to one end of a shield impedance $Z_{SHIELD}$ 110 that is external to the energy transfer element 116. The other end of the shield impedance $Z_{SHIELD}$ 110 is coupled to the non-switching end of the primary winding 118. In other examples, the shield impedance $Z_{SHIELD}$ 110 may be coupled between the external termination of a shield winding and any input conductor that is not switching, such as for example to either end of the dc input capacitor 112.

The switching of switch S1 144 produces a switching voltage $V_{S1}$ 146. The switching voltage $V_{S1}$ 146 produces the noise currents $I_{CM}$ 140, $I_{TE}$ 148, and $I_{SE}$ 152 in the stray impedances $Z_{PE}$ 142, $Z_{TE}$ 150, and $Z_{SE}$ 154 respectively. Stray impedances may in general include capacitance, inductance, and resistance. The nature of the coupling that produces the noise currents, such as currents $I_{CM}$ 140, $I_{TE}$ 148, and $I_{SE}$ 152 and the paths of the noise currents will become apparent after the details are explained later in this disclosure.

Still referring to FIG. 1, noise current $I_{CM}$ 140 in stray impedance $Z_{PE}$ 142 divides to form the noise current $I_{CML}$ 106 in the input conductor 160, and the noise current $I_{CMN}$ 108 in the neutral input conductor 162. Voltage sources appear essentially as short circuits to high frequency noise current, making the line terminal 102 and the neutral terminal 140 essentially common to the noise current $I_{CM}$ 140. Therefore, in one example, noise current $I_{CM}$ 140 is the sum of noise current $I_{CML}$ 106 and noise current $I_{CMN}$ 108.

Noise current $I_{CM}$ 140 is related by values of circuit components to noise current $I_{TE}$ 148 in stray impedance $Z_{TE}$ 150, noise current $I_{SE}$ 152 in stray impedance $Z_{SE}$ 154, and noise current $I_{SHIELD}$ 138 in external shield impedance $Z_{SHIELD}$ 110 that produces a voltage $V_{ZSH}$ 136 across the ends of the external shield impedance $Z_{SHIELD}$ 110. In one example, values of circuit components are selected in a way that will reduce the magnitude of noise current $I_{CM}$ 140 to a level that meets regulatory requirements.

Although some values of components are fixed by the requirements for power conversion, and values of stray quantities are usually not within the designer's control, other values of components may be adjusted over a wide range to affect the magnitude of noise current $I_{CM}$ 140 without substantially affecting the power conversion function. For example, the number of turns $N_B$ of balance winding 120, the number of turns $N_C$ of cancellation winding 122, and value of the external shield impedance $Z_{SHIELD}$ 110 may be adjusted at the discretion of the designer to reduce noise current $I_{CM}$ 140 to an acceptable level.

Figure 2:
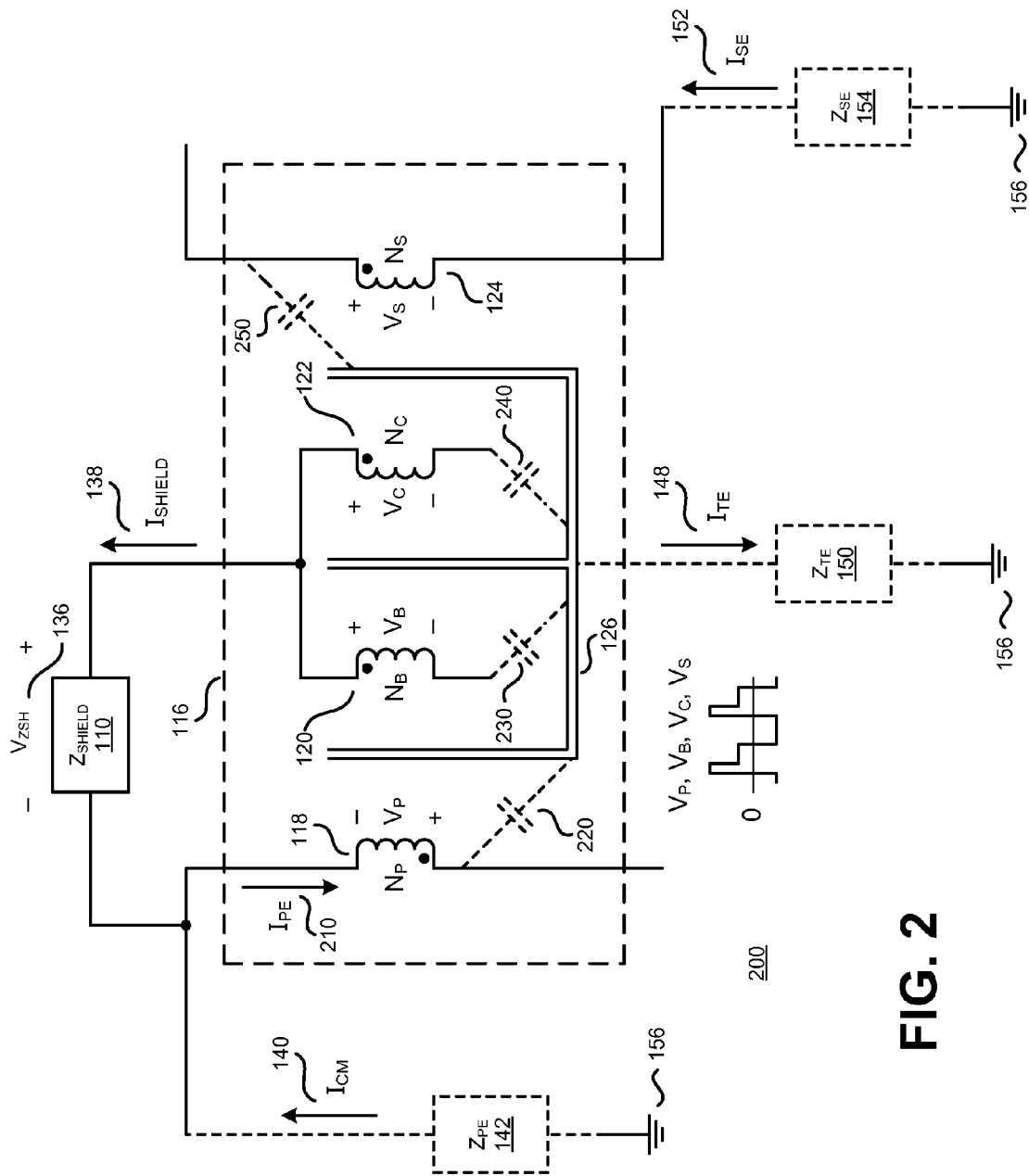
FIG. 2 is a schematic diagram of an example portion of the ac-to-dc power supply of FIG. 1 illustrating stray capacitance and noise currents in more detail within an example energy transfer element in accordance with the teachings of the present invention.

FIG. 2 is schematic diagram 200 that shows a portion of FIG. 1 with additional detail of stray capacitance and noise currents within the energy transfer element 116. Explicit in FIG. 2 are the polarities of the voltages $V_P$ on primary winding 118, $V_B$ on balance winding 120, $V_C$ on cancellation winding 122, and $V_S$ on secondary winding 124. The magnitudes of the voltages on windings 118, 120, 122 and 124 are proportional by the ratios of the turns on the windings, as will be known to one skilled in the art. As such, the waveforms of the voltages on windings 118, 120, 122 and 124 have the same shape, and the transitions occur at the same times on all the windings.

FIG. 2 also shows the internal stray capacitances 220, 230, 240, and 250 of the energy transfer element 116 that couple the windings 118, 120, 122, and 124, the core 126, and the stray impedance $Z_{TE}$ 150 to the earth reference 156. From FIG. 2 it is easy to see how the switching voltages on the windings of the energy transfer element 116 are able to produce displacement current and conduction current in closed paths that include the stay capacitances 220, 230, 240 and 250 and the stray impedance $Z_{TE}$ 150 to earth. For example, the voltage $V_P$ on the primary winding 118 may produce a conduction current $I_{PE}$ 210 that passes through capacitance 220 as a displacement current, contributing to displacement current $I_{TE}$ 148 and returning by way of displacement current $I_{CM}$ 140. It is appreciated that the capacitances 220, 230, 240, and 250 are lumped representations of the actual distributed capacitance that couple displacement currents throughout the structure of energy transfer element 116.

Figure 3:
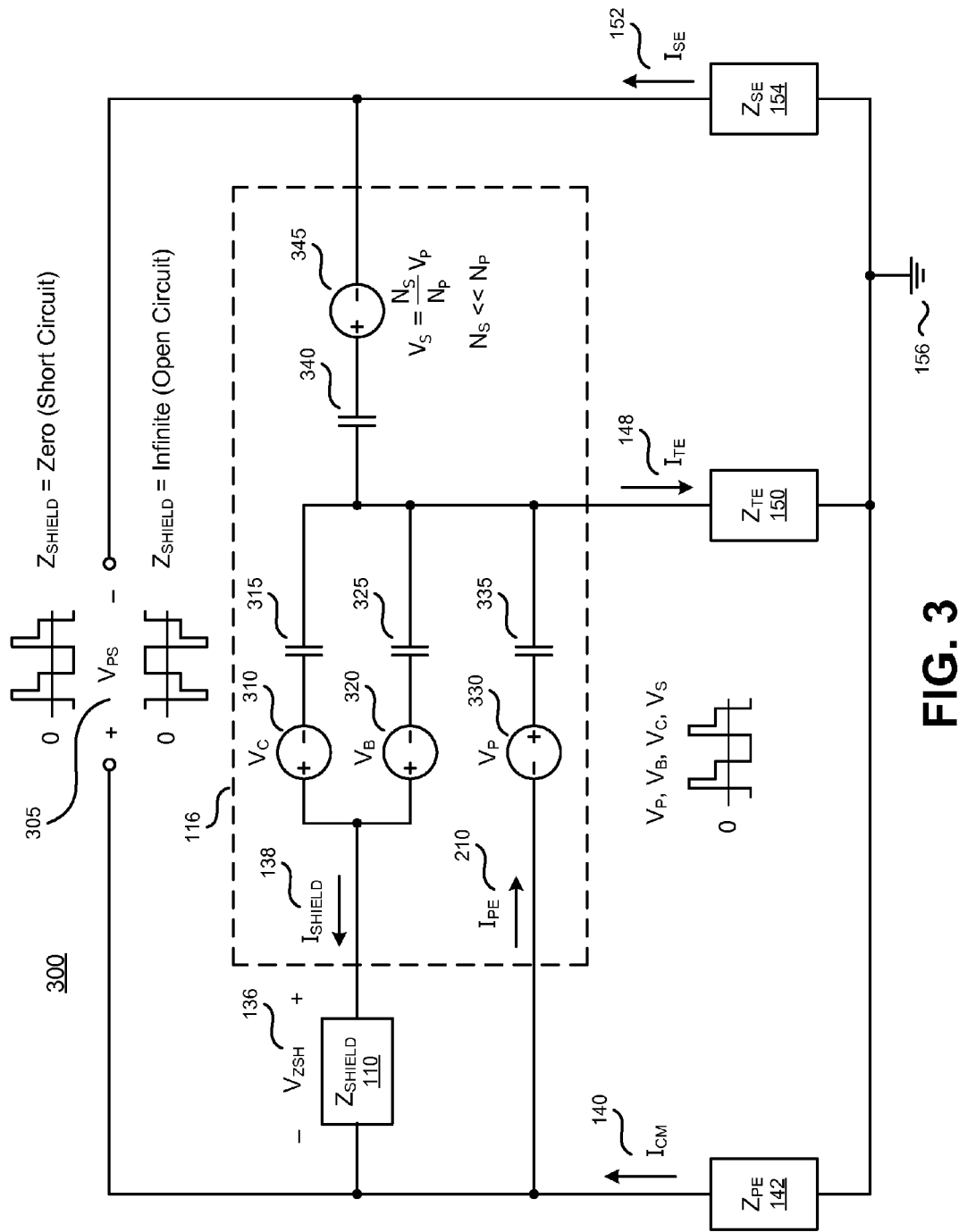
FIG. 3 is a schematic diagram of an example simplified electrical circuit model illustrating example voltages and currents in an example power supply in accordance with the teachings of the present invention.

FIG. 3 is a one example of a simple electric circuit model 300 of the portion of power supply 100 shown in FIG. 2. The voltage sources 330, 320, 310, and 345 represent respectively the voltages on the windings 118, 120, 122, and 124 of the energy transfer element 116. The capacitors 335, 325, 315, and 340 represent respectively the stray capacitances 220, 230, 240, and 250 of the energy transfer element 116.

FIG. 3 identifies a voltage $V_{PS}$ 305 that is a voltage measured between a non-switching conductor on the input of the power supply and a non-switching conductor on the output of the power supply. For example, $V_{PS}$ 305 may be the voltage between one end of dc input capacitor 112 and one end of the output capacitor 130 in FIG. 1.

An analysis of the circuit model of FIG. 3 shows that for voltage sources $V_B$ 320 and $V_C$ 310 of sufficient magnitude, the value of the external shield impedance $Z_{SHIELD}$ 110 may be adjusted to make the noise current $I_{CM}$ 140 zero. In one example, the shield windings are designed to produce higher voltage than would be required for a conventional configuration that has the shield windings 120 and 122 tied to the primary winding 118 internal to the energy transfer element. In the example of FIG. 2, The external shield impedance $Z_{SHIELD}$ 110 reduces the higher voltage from the shield windings by the voltage $V_{ZSH}$ 136 that is the amount necessary to make the shield current $I_{SHIELD}$ 138 substantially equal to the primary noise current $I_{PE}$ 210.

FIG. 3 includes an example of the waveform of the voltage $V_{PS}$ 305 for a practical case where a number of turns $N_S$ of the secondary winding 124 is much less than the number of turns $N_P$ of the primary winding 118. It can be shown either from analysis or by inspection of the circuit model that the waveform of the voltage $V_{PS}$ can be used to adjust the external shield impedance $Z_{SHIELD}$ 110 to make the noise current $I_{CM}$ 140 substantially zero.

When the external shield impedance $Z_{SHIELD}$ 110 is infinite, thereby effectively removing the influence of the voltage sources $V_B$ 320 and $V_C$ 310 from the noise current $I_{CM}$ 140, the waveform of the voltage $V_{PS}$ 305 will be the negative of the waveform of voltage sources $V_P$, $V_B$, $V_C$, and $V_S$ on voltage sources 330, 320, 310, and 345 respectively. When the voltages $V_B$ and $V_C$ on voltage sources 320 and 310 are sufficiently large, a finite value of external shield impedance $Z_{SHIELD}$ 110 may be selected to make the shield current $I_{SHIELD}$ 138 substantially equal to the primary noise current $I_{PE}$ 210, thereby making the noise current $I_{CM}$ 140 substantially zero. When the noise current $I_{CM}$ 140 is zero, the voltage $V_{PS}$ 305 is a value between zero and $V_S$, depending on the values of stray impedances $Z_{SE}$ 154 and $Z_{TE}$ 150, and having a waveform proportional to $V_S$.

Further reduction of the value of external shield impedance $Z_{SHIELD}$ 110 from the value that corresponds to substantially zero noise current $I_{CM}$ 140 will cause the noise current $I_{CM}$ 140 to increase in the negative direction, further increasing the magnitude of the voltage $V_{PS}$ 305 with a waveform proportional to $V_S$. Therefore, the waveform of the voltage $V_{PS}$ 305 is useful to adjust the value of the external shield impedance $Z_{SHIELD}$ 110 empirically to achieve substantially zero noise current $I_{CM}$ 140 without a direct measurement of current.

A value of external shield impedance $Z_{SHIELD}$ 110 that is higher than desired will produce a waveform for voltage $V_{PS}$ 305 that is the opposite polarity of the waveform of the voltages $V_P$, $V_B$, $V_C$, and $V_S$. A value of external shield impedance $Z_{SHIELD}$ 110 that is lower than desired will produce a waveform for voltage $V_{PS}$ 305 that is the same polarity of the waveform of the voltages $V_P$, $V_B$ $V_C$, and $V_S$. In accordance with the teachings of the present invention, a desired value of external shield impedance $Z_{SHIELD}$ 110 may lie between two values that produce waveforms of opposite polarity for voltage $V_{PS}$ 305. Furthermore, a preferred value for shield impedance $Z_{SHIELD}$ 110 may result in the lowest magnitude of the voltage $V_{PS}$ 305.

The desired value of external shield impedance $Z_{SHIELD}$ 110 is a non-zero finite value that substantially reduces the common mode noise current in the input conductors (e.g., input conductors 160 and 162) from the from the magnitude that occurs at substantially zero impedance and from the magnitude that occurs at substantially infinite impedance.

In one example, a desired value for the external shield impedance $Z_{SHIELD}$ 110 is realized with a capacitor. One skilled in the art will understand that the value of the impedance is higher when the value of the capacitor is lower. In other words, smaller values of capacitance have larger impedance. It is appreciated that one may arrive at the desired value for the external shield impedance $Z_{SHIELD}$ 110 either by incrementally increasing or by incrementally decreasing the value of the impedance until the waveform of the voltage $V_{PS}$ 305 reverses polarity.

Figure 4:
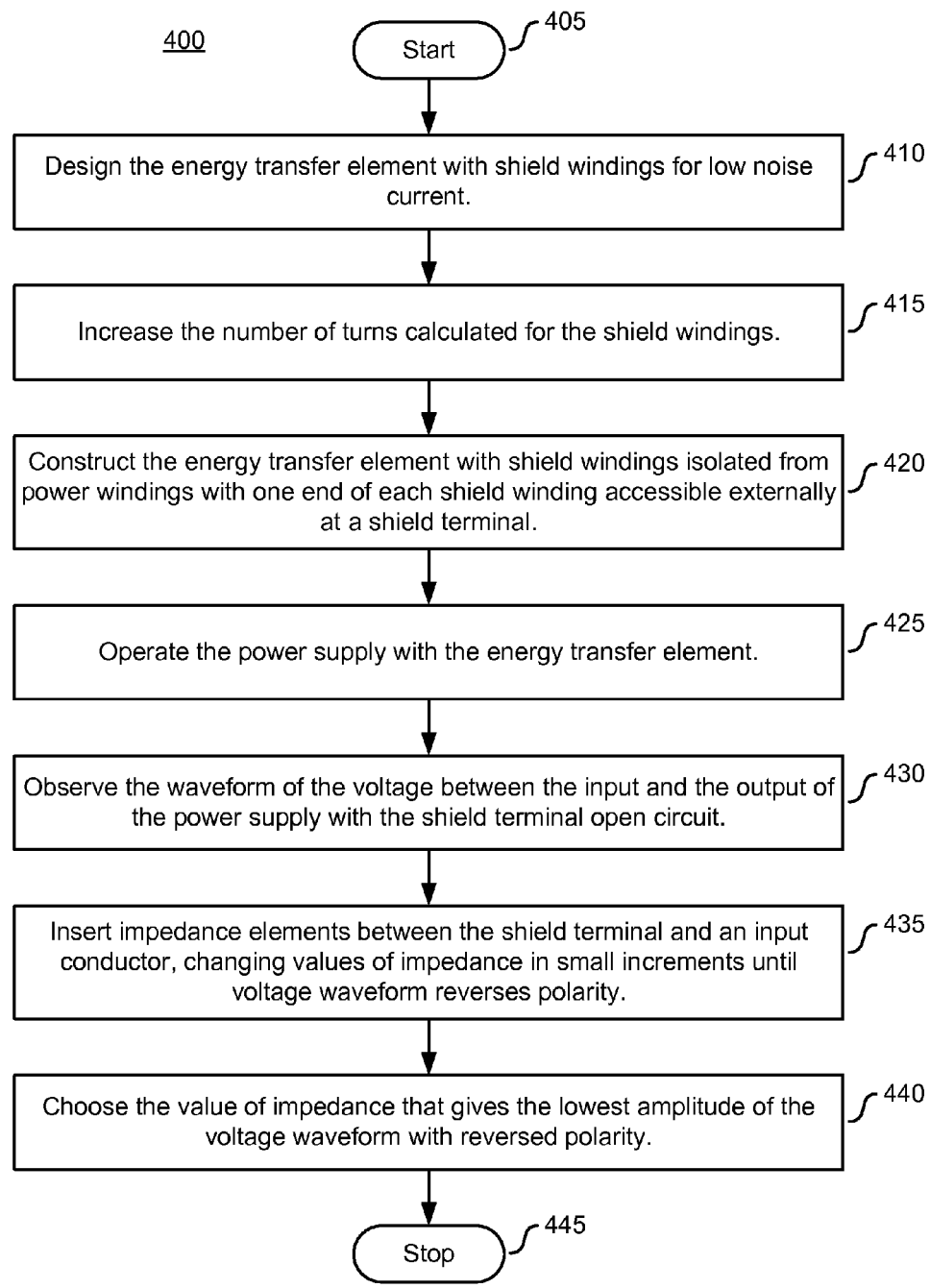
FIG. 4 is a flow diagram illustrating an example method in accordance with the teachings of the present invention.

FIG. 4 is a flow diagram 400 that illustrates an example a method to adjust displacement current in an energy transfer element, such as energy transfer element 116, according to the teachings of the present invention. After starting in block 405, techniques are used in block 410 to design an energy transfer element with shield windings for low noise current. In one example, the design of the energy transfer element includes calculating the number of turns for a shield winding of the energy transfer element. For example, the number of turns for a shield winding may be calculated such that a power supply without a shield impedance (e.g., shield impedance value equal to zero) would operate with approximately zero noise current. These techniques may be automated in software tools such as for example the PI Transformer Designer tool in the PI Expert Design Software Suite v. 6.6 available from Power Integrations, Inc., San Jose, Calif.

However, if the calculated number of turns for the shield winding is small (e.g., less than 10) then it may be difficult to eliminate the noise current by only adjusting the number of turns in the shield winding. Thus, in block 415, the number of turns for the shield windings is increased over the number calculated by the established technique. For less than 10 turns, an increase of one or two turns is typically sufficient. For more than 10 turns, an increase of between 10 percent and 20 percent is typically sufficient. For a power supply without a shield impedance (e.g., shield impedance value equal to zero) the increase in the number of turns in the shield winding may cause an increase in noise current. Therefore, a shield winding in accordance with the examples disclosed herein may include a first number of turns configured to reduce the noise current substantially to zero in a power supply having a shield impedance value of zero and may have an additional second number of turns configured to increase the noise current to greater than zero in the power supply having the shield impedance value of zero. This increase in noise current due to the increased number of turns in the shield windings may subsequently be reduced or eliminated by the addition and adjustment of the shield impedance (described below).

The energy transfer element is then constructed in block 420 with one end of the shield windings accessible externally at a shield terminal of the energy transfer element. The power converter is operated with the energy transfer element in block 425. The waveform of the voltage between the input and the output of the power supply is observed with the shield terminal open circuit in block 430.

In block 435 impedance elements are inserted between the shield terminal and an input conductor of the power supply while the voltage waveform is observed. The impedance is changed in small increments until the voltage waveform reverses polarity to be the opposite of the polarity with the shield terminal open circuit. In one example, the impedance element is a capacitor. In other examples, the external shield impedance $Z_{SHIELD}$ 110 may include a network of elements of different types such as resistors, capacitors, and inductors.

In block 440 the impedance is selected from a plurality of permissible values to give the lowest amplitude of the voltage waveform that has the polarity opposite of the polarity with the shield terminal open circuit. The process may complete in block 445.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method, comprising:
    calculating a first number of turns of a shield winding included in an energy transfer element of a power supply, wherein the first number of turns of the shield winding is greater than zero and is calculated for the power supply to have a low noise current in an input conductor of the power supply;
    increasing the first number of turns for the shield winding to a second number of turns, wherein the second number of turns is greater than the first number of turns;
    operating the power supply to generate a first voltage waveform of a voltage between the input conductor and an output conductor of the power supply;
    after operating the power supply to generate the first voltage waveform, inserting an impedance between the shield winding and the input conductor of the power supply; and
    reducing the noise current in the input conductor by adjusting a value of the impedance until a second voltage waveform of the voltage between the input conductor and the output conductor of the power supply reverses polarity to be the opposite of a polarity of the first voltage waveform in response to the adjusting of the value of the impedance.

2. The method of claim 1, wherein increasing the first number of turns for the shield winding to the second number of turns increases the noise current in the input conductor of the power supply for the power supply operating with the value of the impedance equal to zero.

3. The method of claim 1, wherein calculating the first number of turns of the shield winding to achieve a low noise current in the input conductor of the power supply includes calculating the first number of turns of the shield winding to achieve a substantially zero noise current in the input conductor of the power supply for the power supply operating with the value of the impedance equal to zero.

4. The method of claim 1, further comprising adjusting the value of the impedance to reduce an amplitude of the second voltage waveform after the second voltage waveform reverses polarity.

5. The method of claim 4, wherein adjusting the value of the impedance to reduce the amplitude of the second voltage waveform includes adjusting the value of the impedance to achieve a substantially zero noise current in the input conductor of the power supply.

6. The method of claim 1, further comprising adjusting the value of the impedance until an amplitude of the second voltage waveform is a lowest amplitude after the second voltage waveform reverses polarity.

7. The method of claim 1, wherein the first number of turns of the shield winding is less than 10 and wherein increasing the first number of turns includes increasing the first number of turns by approximately 1 or 2.

8. The method of claim 1, wherein the first number of turns of the shield winding is more than 10 and wherein increasing the first number of turns includes increasing the first number of turns in the range of approximately 10 percent to approximately 20 percent.

9. The method of claim 1, wherein the shield winding with the first number of turns produces a first voltage and wherein the shield winding with the second number of turns produces a second voltage, wherein the second voltage is greater than the first voltage.

10. The method of claim 9, further comprising adjusting the value of the impedance to reduce the second voltage by an amount that makes a shield current substantially equal to a primary noise current.

11. The method of claim 1, wherein calculating the first number of turns of the shield winding to achieve a low noise current includes designing the shield winding to have a similar number of turns as a number of turns in a power winding of the energy transfer element.

12. The method of claim 1, wherein the energy transfer element includes a shield terminal that is externally accessible with respect to the energy transfer element and wherein the impedance is coupled between the shield terminal and the input conductor of the power supply.

13. The method of claim 1, wherein the input conductor and an output conductor of the power supply are non-switching conductors of the power supply.

\* \* \* \* \*